(12) United States Patent
Neuman

(10) Patent No.: US 11,161,211 B1
(45) Date of Patent: Nov. 2, 2021

(54) DUAL ROTARY POSITIONING APPARATUS AND METHOD

(71) Applicant: AUTOMATED ASSEMBLY CORPORATION, Lakeville, MN (US)

(72) Inventor: David Neuman, Randolph, MN (US)

(73) Assignee: AUTOMATED ASSEMBLY CORPORATION, Lakeville, MN (US)

( * ) Notice: Subject to any disclaimer, the term of this patent is extended or adjusted under 35 U.S.C. 154(b) by 93 days.

(21) Appl. No.: 16/021,122

(22) Filed: Jun. 28, 2018

(51) Int. Cl.
*B23Q 7/02* (2006.01)
*B23Q 3/06* (2006.01)
*B23Q 3/157* (2006.01)

(52) U.S. Cl.
CPC .............. *B23Q 7/02* (2013.01); *B23Q 3/061* (2013.01); *B23Q 3/15724* (2016.11)

(58) Field of Classification Search
CPC ...... B23Q 7/02; B23Q 3/061; B23Q 3/15724; B23Q 3/15722; B23Q 3/1572; B23Q 3/15733; B23Q 2003/15586
See application file for complete search history.

(56) References Cited

U.S. PATENT DOCUMENTS

| 6,352,496 | B1 | 3/2002 | Oldani | |
|---|---|---|---|---|
| 8,220,788 | B2 * | 7/2012 | Lube | B23Q 7/02 269/55 |
| 2005/0060879 | A1 * | 3/2005 | Kumeth | B23P 21/006 29/785 |

FOREIGN PATENT DOCUMENTS

| AT | 299653 B | * | 6/1972 | B23Q 7/02 |
|---|---|---|---|---|
| DE | 102013108742 A1 | * | 1/2019 | B23Q 1/58 |
| FR | 2546095 A1 | * | 11/1984 | B21D 43/14 |
| GB | 1240397 A | * | 7/1971 | B23Q 7/02 |

* cited by examiner

Primary Examiner — Daniel D Yabut
(74) Attorney, Agent, or Firm — Crawford Maunu PLLC

(57) ABSTRACT

A disclosed apparatus and related method are directed to engagement of a tool with a workpiece, utilizing a first platen having a first axis of rotation and a workpiece mount and a second platen having a second axis of rotation and a tool mount. The first platen moves the workpiece mount along a first arc by rotating about the first axis of rotation, and the second platen moves the tool mount along a second arc by rotating about the second axis of rotation. The first and second platens rotate relative to one another such that a tool-workpiece intersection point (e.g., a tool endpoint), which is offset from and fixed relative to the second platen, follows a tool path that is offset from and fixed relative to the first platen as the first and second platens rotate.

22 Claims, 14 Drawing Sheets

DUAL ROTARY POSITIONING APPARATUS AND METHOD

FIELD OF THE INVENTION

The disclosure describes a dual rotary positioning apparatus having respective platens movable for positioning a workpiece relative to a tool.

BACKGROUND

A variety of different types of automated apparatuses, systems and methods are implemented for a multitude of disparate tasks involving positioning of respective components, such as movement of a tool or other component relative to a target or workpiece. Applications may involve, for example, machining of workpieces, assembly of components, joining of components such as by welding, material handling, coating such as painting or metal plating, 3D printing, computer numerical control (CNC), and more.

Controlling movement of the tool or other component can be challenging, and complex componentry is often implemented for doing so. For instance, CNC machines and robotic actuators are often elaborate and expensive. In addition, operating such componentry often takes high skill, and involves complex interpolation and/or other calculations.

These and other considerations have presented challenges to the design, operation and implementation of a variety of different types of positioning componentry.

SUMMARY

A disclosed apparatus includes a first platen having a first axis of rotation, the first platen being configured and arranged to hold a workpiece and to move the workpiece along a first arc by rotating about the first axis of rotation. The apparatus also includes a second platen having a second axis of rotation, the second platen being configured and arranged to secure a tool and to move the tool along a second arc by rotating about the second axis of rotation. The first and second platens are configured and arranged to operate with each other to engage the tool with the workpiece by moving the workpiece and the tool respectively along the first arc and the second arc, via relative rotation about the respective first and second axes of rotation.

Another disclosed apparatus includes a first platen having a first axis of rotation and a workpiece mount, and a second platen having a second axis of rotation and a tool mount. The first platen moves the workpiece mount along a first arc by rotating about the first axis of rotation, and the second platen moves the tool mount along a second arc by rotating about the second axis of rotation. The first and second platens rotate relative to one another such that a tool-workpiece intersection point, which is offset from and fixed relative to the second platen, follows a tool path that is offset from and fixed relative to the first platen, as the first and second platens rotate.

A disclosed method is as follows. A workpiece is mounted to a first platen having a first axis of rotation. A tool, which is mounted to a second platen having a second axis of rotation, is engaged with the workpiece as follows. The first platen is rotated about the first axis of rotation, therein moving the workpiece along a first arc relative to the first axis of rotation. The second platen is rotated about the second axis of rotation, therein moving the tool along a second arc relative to the second axis of rotation. In various contexts, engaging the tool with the workpiece includes moving the tool along a tool path on the workpiece via rotation of the first platen and the second platen. In some embodiments, the tool path is converted to relative rotational coordinates for the first and second platens, and the first and second platens are rotated relative to one another based on the converted coordinates.

The above summary is not intended to describe each disclosed embodiment. The figures and detailed description that follow provide additional example embodiments.

BRIEF DESCRIPTION OF THE DRAWINGS

Other aspects and advantages will become apparent upon review of the Detailed Description and upon reference to the drawings in which:

FIGS. 10A-10C show an apparatus with multiple rotary positioning components, in accordance with another implementation, in which:

FIG. 10A shows a top perspective view,

FIG. 10B shows a bottom perspective view, and

FIG. 10C shows an enlarged view.

DETAILED DESCRIPTION

Figure 1A:
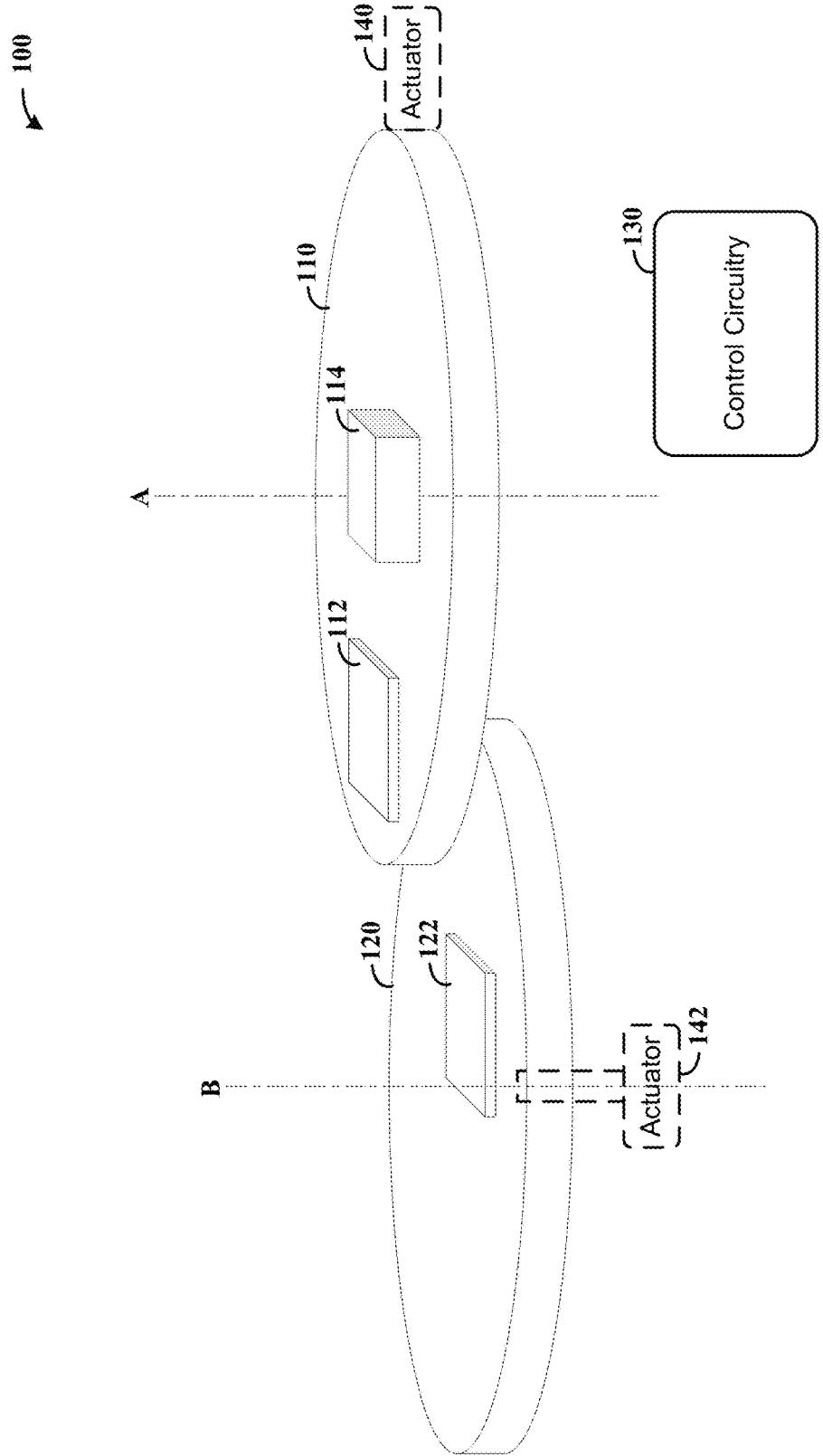
FIG. 1A shows a dual rotary positioning apparatus, according to one implementation.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Various embodiments are directed to positioning respective components relative to one another, via rotation of respective platens/surfaces to which the components are coupled. A point coordinate system at an intersection of respective arcs at which the respective components interact is used with rotation of the respective platens/surfaces to control engagement. For instance, an engagement point of a tool, such as a wire deposition tool, machining tool, coating tool, or welding tool, can be mounted or otherwise coupled to a platen, relative to the platen's axis of rotation, and a workpiece can be mounted or otherwise coupled to the other platen, relative to the other platen's axis of rotation. The respective platens are rotated relative to one another such that the engagement point engages with a workpiece mounted to the other platen along a designated tool path. Rotation of the respective platens is derived from the tool path, and implemented accordingly.

In the context of various embodiments herein, a tool path refers to a path along which a tool travels for engagement with a workpiece. Such a tool path may lie along or within the workpiece for applications such as milling, in which a tool directly engages with the workpiece for milling material therefrom. Such a tool path may be offset from the workpiece, such as for applying material to a surface of a workpiece (e.g., depositing metal or other coating material), or for non-contact interaction with the workpiece (e.g., laser cutting). Accordingly, such a tool path may remain stationary, or fixed, relative to movement (including rotation) a platen and a workpiece mounted to the platen. Where used in connection with a tool mounted in a fixed position relative to a second platen, combined, relative motion of the respective platens can be effected to engage the tool with a workpiece along the tool path.

In various embodiments, a tool is mounted to a top platen, or disk, such that rotation of the platen about its axis of rotation causes the tool to traverse an arc that includes a center region of an underlying platen, or disk, that holds a workpiece or other part with which the tool engages. This approach may, for instance, facilitate engagement of the tool with all needed regions of a workpiece. Further, various embodiments involve the use of multiple tools and/or multiple workpieces on respective platens, with arcs along which tool engagement points may interact with the respective workpieces.

As may be implemented in accordance with various embodiments, an apparatus includes first and second platens, respectively, having first and second axes of rotation. Each platen may rotate about a shaft or other component aligned with the axis of rotation. The first platen holds one or more workpieces, and moves the workpiece(s) along an arc by rotating about the first axis of rotation. The second platen secures one or more tools and moves the tool(s) along an arc by rotating about the second axis of rotation. The respective arcs have constant radii and centers at the respective axes of rotation, and relative rotational movement about the axes of rotation is utilized to control engagement of the tool and workpiece. In certain embodiments, the platens are configured and arranged relative to one another such that the second arc crosses over the first axis of rotation.

In accordance with one or more embodiments, the apparatus further includes an actuator circuit that rotates the first and second platens relative to one another along the respective first and second arcs, and therein causes the tool to engage with the workpiece along a defined tool path. Specifically, an intersection of respective arcs along which the tool and workpiece travel is controlled, as the first and second platens move relative to one another, to follow the tool path. The actuator circuit is configured and arranged to convert the tool path to relative rotational coordinates for the first and second platens, and to rotate the first and second platens based on the converted coordinates.

A variety of different types of motion systems and components may be utilized with platens and other rotatable surfaces as characterized herein. In some embodiments, first and second actuators are respectively coupled to and configured to rotate the first and second platens as noted above, about respective first and second axes of rotation. Such an actuator may, for example, include a stepper motor, servo motor, or other step and direction componentry, such as the ClearPath-SD available from Teknic of Victor, N.Y. In some implementations, one or both actuators mechanically engage with a perimeter of the respective platen it is rotating. In other implementations, one or both actuators mechanically engage with and rotate a center portion of the platen at its axis of rotation, such as by engaging with a shaft or other component that mechanically affixes the actuator to the platen. Such an actuator may include, for example, an electromechanical actuator that rotates the respective platen to which it is coupled in response to inputs from a control circuit.

The apparatus may be implemented with a variety of different types of tools, consistent with the above. In a particular embodiment, the second platen is configured to secure a material feeder at a fixed position relative to the tool and to maintain the fixed relative positioning of the material feeder as the second platen rotates about the second axis. The material feeder may, for example, feed wire for adhering to a substrate, utilize wire used for welding in connection with a welding tool, coating material such as paint (liquid or powder) used with a coating tool, liquid for liquid jet cutting, plasma for plasma cutting, gas, plastic (e.g., for extrusion), or a variety of other materials. In some implementations the apparatus also includes such a material feeder secured to the second platen and operable to provide the material to the tool as the tool is engaged with the workpiece. The apparatus may further include one or more tools, which operates to transfer the material to the workpiece via the engagement.

In various implementations, the apparatus includes a control circuit and first and second actuators respectively coupled to and configured to rotate the first and second platens about their respective axes of rotation. The control circuit causes the tool to engage with the workpiece along a tool path that follows an intersection of respective arcs along which the tool and workpiece move, by driving the first and second actuators to rotate the first and second platens accordingly. The control circuit may derive or obtain information upon which the platen rotation can be controlled in a variety of manners. In some embodiments, the control circuit (e.g., a microprocessor) converts the tool path to relative rotational coordinates for the first and second platens, and respectively drives the first and second actuators to rotate the first and second platens based on the converted coordinates.

Another embodiment is directed to an apparatus having first and second platens, each having an axis of rotation. The first platen has a workpiece mount and is operable for moving the workpiece mount along a first arc by rotating about its axis of rotation. The second platen has a tool mount and is operable for moving the tool mount along a second arc by rotating about its axis of rotation. The workpiece and/or tool mounts can be a location on the respective platen, a physical structure on the platen, integrated with the platen, or implemented in a variety of other manners. The platens rotate relative to one another such that a tool-workpiece intersection point offset from and fixed relative to the second platen follows a tool path, which is offset from and fixed relative to the first platen, as the first and second platens rotate.

A variety of tool paths and related tool-workpiece interaction may be implemented to suit particular embodiments. For instance, an engagement portion of a tool mounted to the first platen may be fixed at the intersection point, with a workpiece mounted to the second platen via the workpiece mount. A control circuit can control movement of the first and second platens along the respective arcs such that the engagement portion of the tool engages with the workpiece along the tool path. By way of example, such a tool path may involve a weld line on a workpiece secured to the second platen, with the first platen holding a welding tool. The intersection point is a point on the tool path to be welded, and the respective platens are rotated to effect the welding. The control circuit may, for example, operate to convert the tool path to relative rotational coordinates for the first and second platens, and control rotation of the platens based on the converted coordinates.

Turning now to the Figures, FIG. 1A shows a dual rotary positioning apparatus 100, according to an implementation. The apparatus includes a first platen 110 having a tool mount region 112, and a second platen 120 having a workpiece mount 122. Each platen is configured to rotate about an axis of rotation, with axes of rotation A and B shown by way of example. The respective platens can be supported in a variety of manners, such as by engaging with underlying bearings or rollers, by a shaft extending along an axis of rotation, along their perimeter, or via other suspension.

By way of example, the apparatus 100 is shown with control circuitry 130, which may operate to control relative rotation of the respective platens. Exemplary actuators 140 and 142 may be implemented to rotate the respective platens. Actuator 140 engages with a perimeter of platen 110, such as via a belt, gear, friction coupling, or other type of engagement. Actuator 142 engages with platen 120 near its axis of rotation, such as by engaging with a shaft connected to or part of the platen, or insertion of a shaft into a receiver of the platen. Each or both type(s) of actuator may be implemented with each platen, and other actuators may be utilized in place of, or in addition to, those shown. Indeed, rotation of the respective platens about their axis of rotation can be provided in a variety of manners, to suit particular applications.

In some embodiments, the apparatus 100 includes a material supply component 114, which operates to provide material to a tool mounted to the tool mount region 112. The material supply component 114 may, for example, provide source material for deposition on and/or use with a workpiece, such as a coating material, metal for welding, gas, liquid, plastic, or other material. The material supply component 114 can be mounted on the platen 110 such that it is fixed, relative to the tool mount region 112 and any tool secured thereto. In this context, the material supply component 114 and a tool mounted to the tool mount region 112 can be fixed in position relative to one another while the platen 110 moves.

Figure 1B:
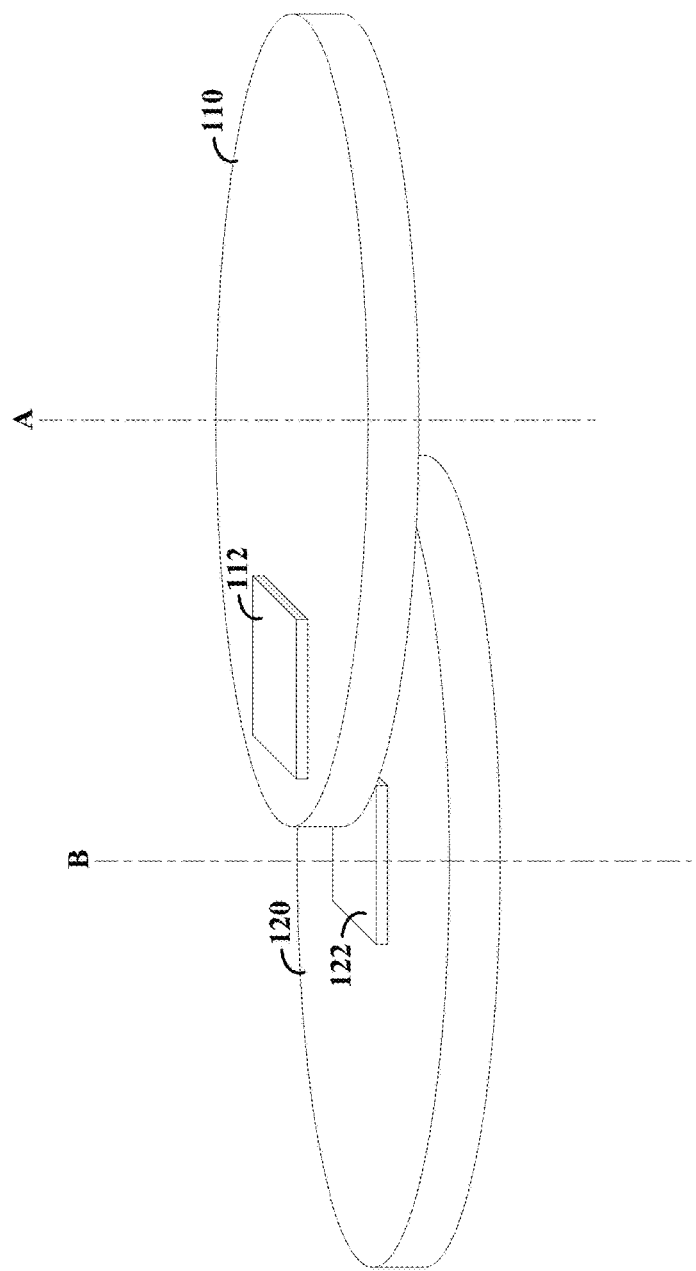
FIG. 1B shows the dual rotary positioning apparatus in an alternate configuration, according to another implementation.

The platens 110 and 120 can be arranged relative to one another to suit a variety of applications. FIG. 1B shows the dual rotary positioning apparatus 100 in an alternate configuration, according to another such implementation. Platen 110 is shown positioned with its perimeter and tool mount region 112 close to the axis of rotation "B" of platen 120, such that a mounted tool may cross the axis of rotation. In some implementations, the platen 110 is positioned such that its perimeter overlies or intersects the axis of rotation "B." Further arrangements are also possible, such as with the tool mount region 112 located on an underside of platen 110, different lateral positioning of the respective platens, or planar inclinations of the respective platens.

Figure 1C:
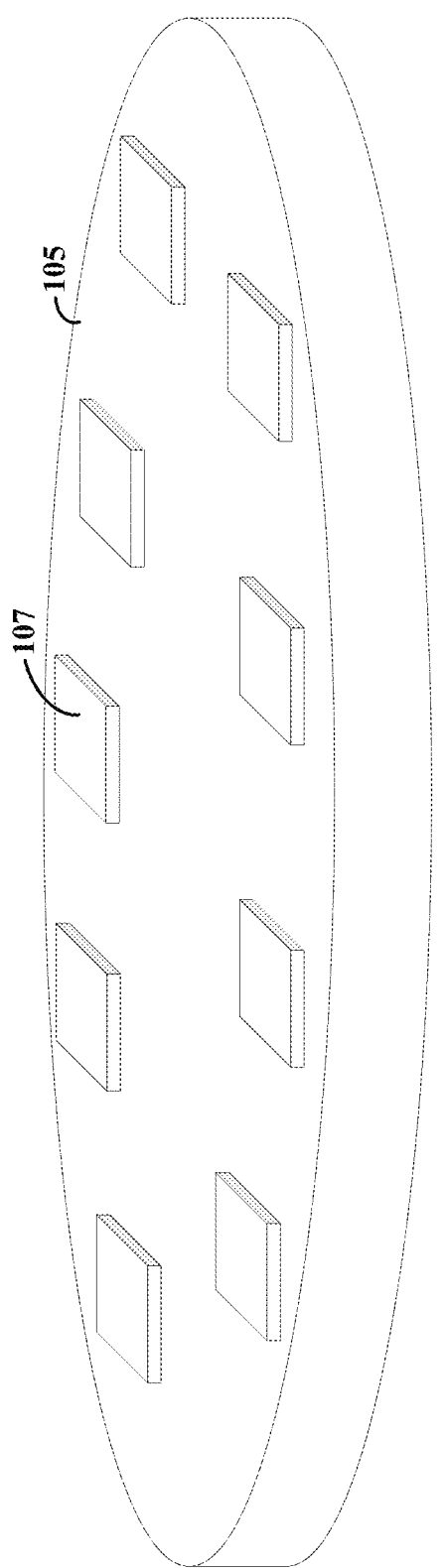
FIG. 1C shows a platen of the dual rotary positioning apparatus with multiple mount locations, according to another implementation.

FIG. 1C shows a platen 105 as may be implemented with the dual rotary positioning apparatus 100 as shown in FIG. 1A or 1B with multiple mount locations, according to another implementation. Nine mount locations are shown, with mount location 107 labeled by way of example. However it should be understood that various different numbers of mounting locations may be utilized to suit particular embodiments. The platen 105 may, for example, be implemented as platen 110 to provide multiple tool mounting locations, to facilitate interaction of multiple tools with one or more workpieces. The platen 105 may also be implemented as platen 120 to provide multiple workpiece mounting locations, used in connection with a platen having a single or multiple tool mounting locations.

Figure 2:
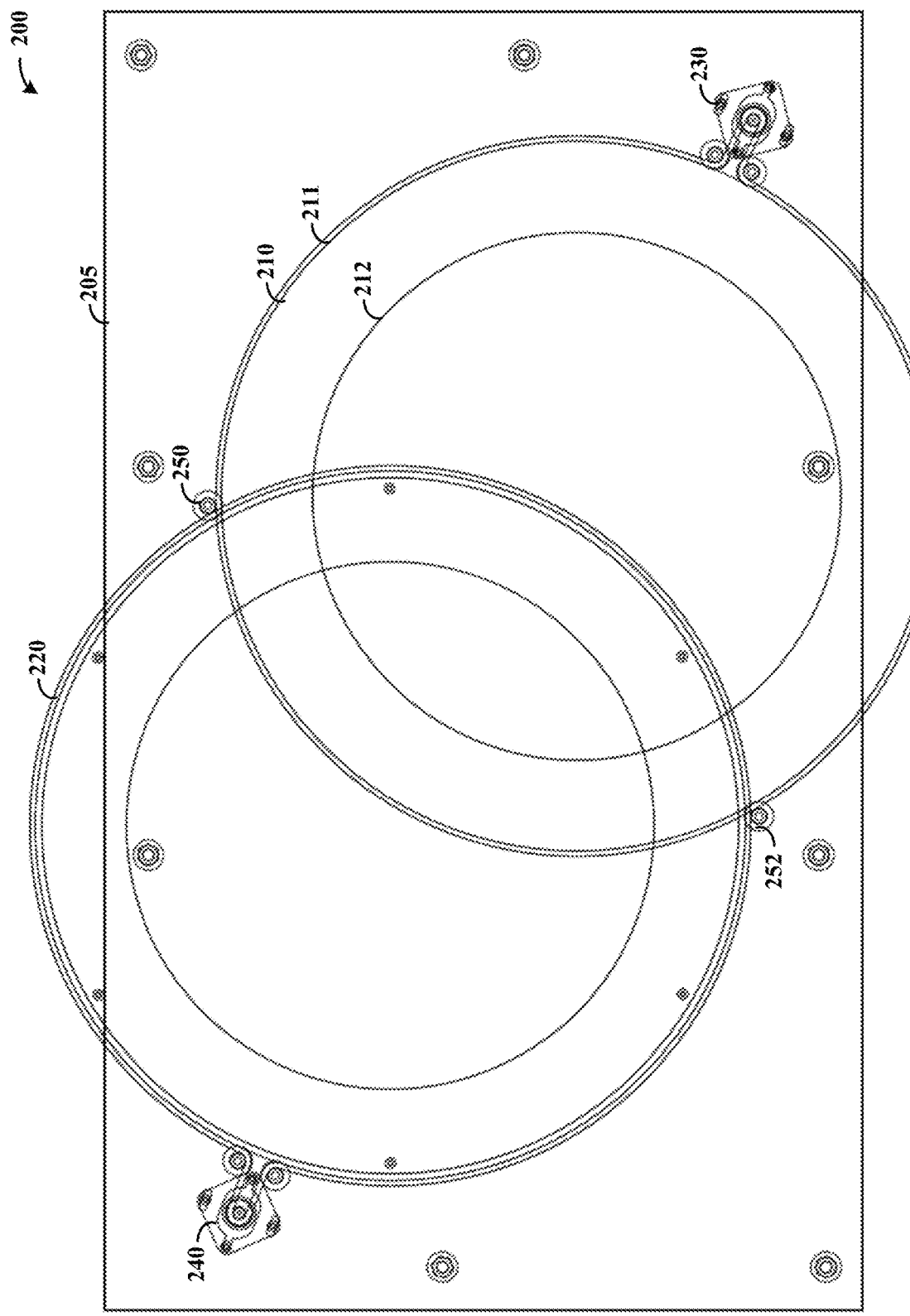
FIG. 2 shows a top view of another dual rotary positioning apparatus, according to an implementation.

FIG. 2 shows a top view of another dual rotary positioning apparatus 200, according to an implementation. The apparatus 200 includes a base 205 on which a first platen 210 and second platen 220 are located, with the first platen overlapping the second. Each platen is respectively driven along its perimeter by actuators 230 and 240, and are respectively supported by components 250 and 252 that are not driven. Alternately, however, one or both platens may be driven to rotate about a central axis by other mechanical engagement. The platens may, for example, have planar surfaces extending within an outer perimeter thereof, with perimeter 211 shown by way of example. A concentric feature (e.g., 212, labeled by way of example) may define outer and inner regions of the respective platens, which may be of disparate thickness. Tools and workpieces may be mounted to the respective platens, in manners such as characterized herein (e.g., utilizing mount regions as shown in FIG. 1A).

Figure 3:
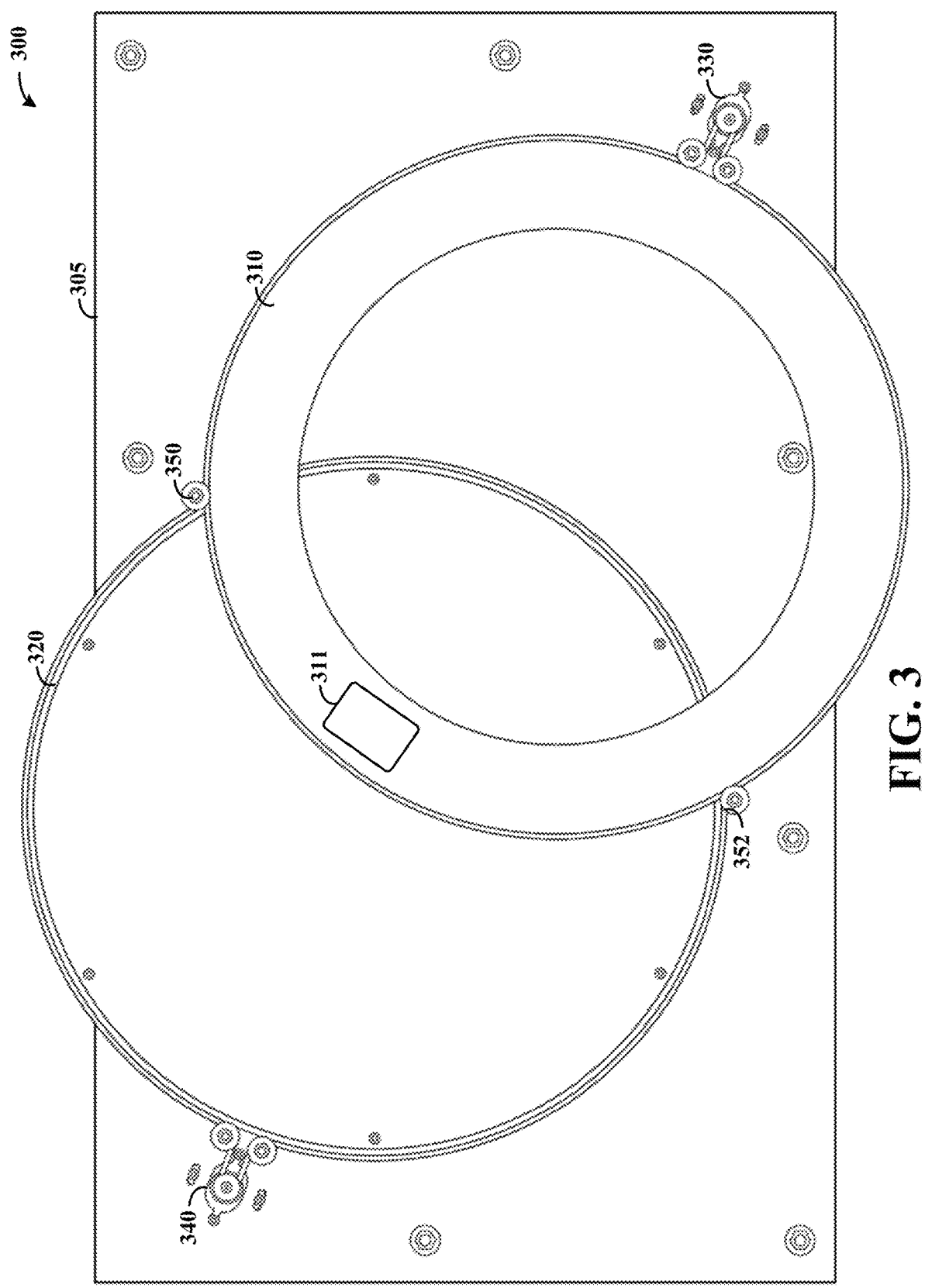
FIG. 3 shows a top view of another dual rotary positioning apparatus, according to an implementation.

FIG. 3 shows a top view of another dual rotary positioning apparatus 300, according to an implementation. The apparatus 300 may, for example, be implemented in accordance with apparatus 200 shown in FIG. 2 and as characterized above, and includes similar numbering. The apparatus 300 includes base 305 on which first and second platens 310 and 320 are located, with the first platen overlapping the second. The second platen 320 is shown with a uniform surface, and with the first platen including a concentric feature (e.g., a tool may be mounted at region 311). Each platen is respectively driven along its perimeter by actuators 330 and 340, and are respectively supported by components 350 and 352.

Figure 4:
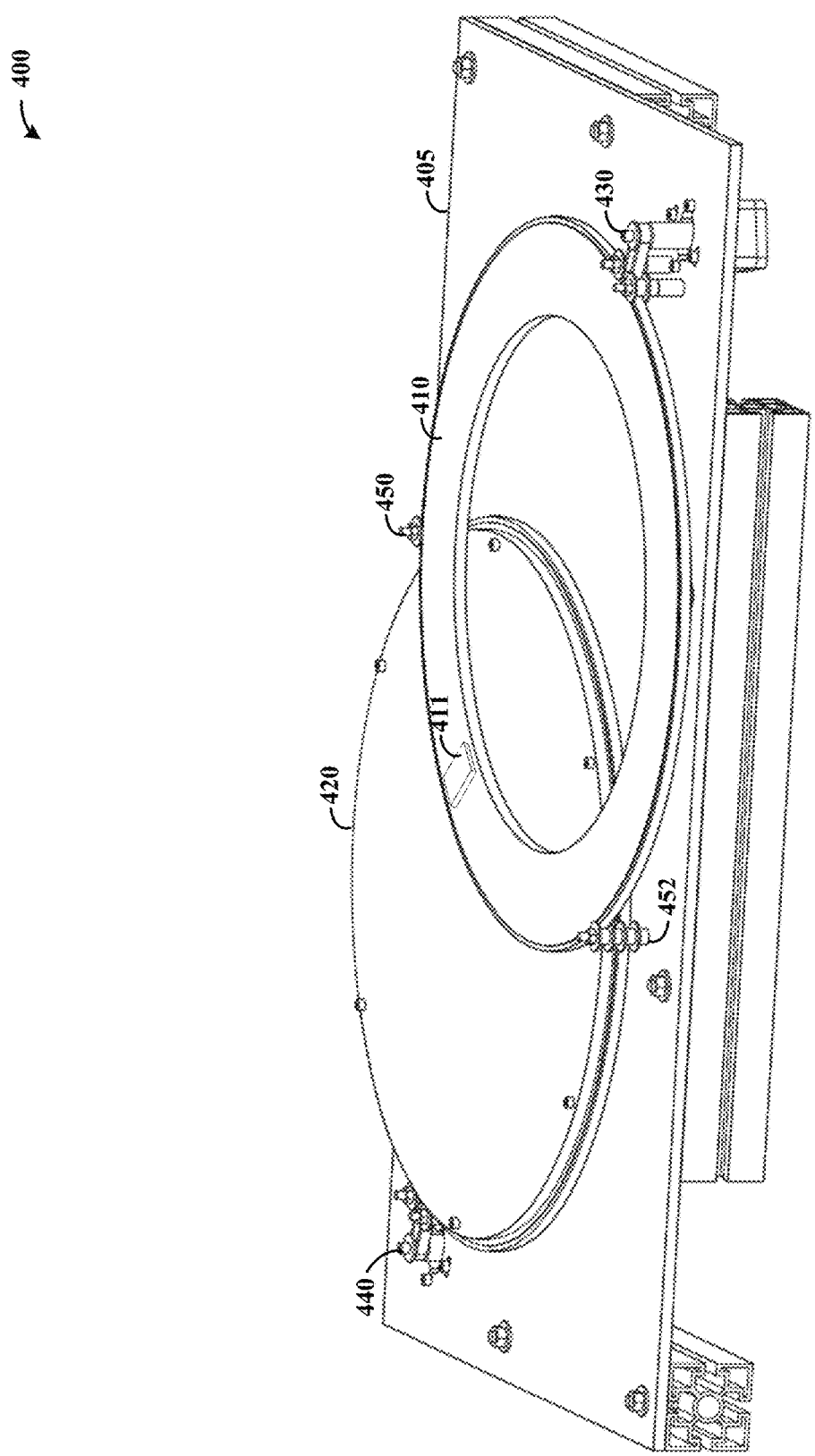
FIG. 4 shows a top perspective view of a dual rotary positioning apparatus, according to an implementation.

FIG. 4 shows a top perspective view of a dual rotary positioning apparatus 400, according to an implementation. The apparatus 400 may, for example, be implemented in accordance with apparatus 300 shown in FIG. 3 and as characterized above, and includes similar numbering. The apparatus 400 includes base 405 on which first and second platens 410 and 420 are located, with the first platen overlapping the second. The second platen 420 is shown with a uniform surface, and with the first platen 410 including a concentric feature (e.g., a tool may be mounted at region 411 with an open region in the center of the platen). Each platen is respectively driven along its perimeter by actuators 430 and 440, and are respectively supported by components 450 and 452.

Figure 5:
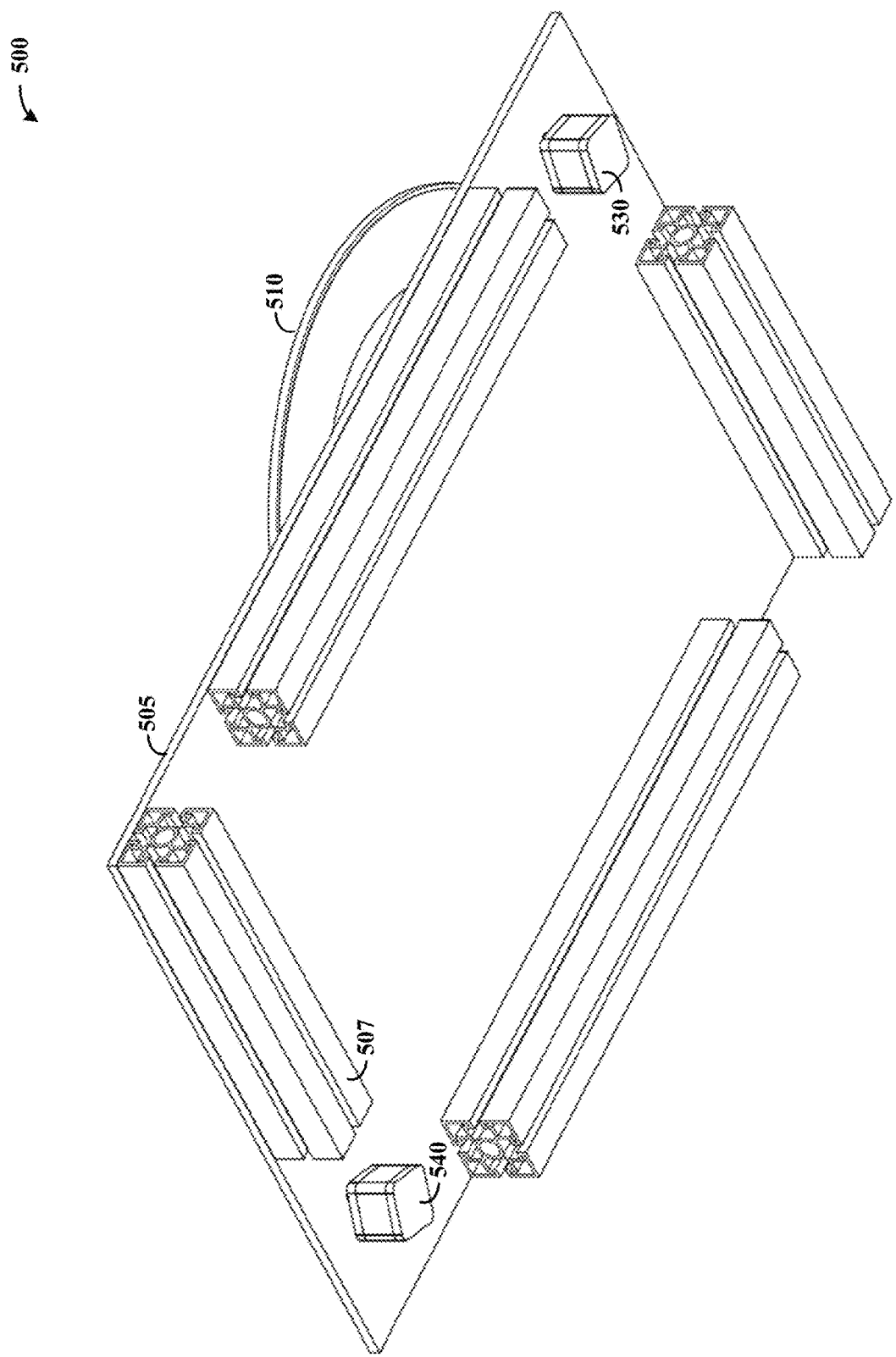
FIG. 5 shows a bottom perspective view of a dual rotary positioning apparatus, according to an implementation.

FIG. 5 shows a bottom perspective view of a dual rotary positioning apparatus 500, according to an implementation. The apparatus 500 may, for example, be implemented in accordance with apparatus 200 shown in FIG. 2 and/or 300 shown in FIG. 3 and as characterized above, and includes similar numbering. The apparatus 500 includes base 505 on which first and second platens are located, with multiple supports including support 507. The first platen 510 is shown as visible from the perspective shown. Each platen is respectively driven along its perimeter by actuators including motors 530 and 540.

Figure 6:
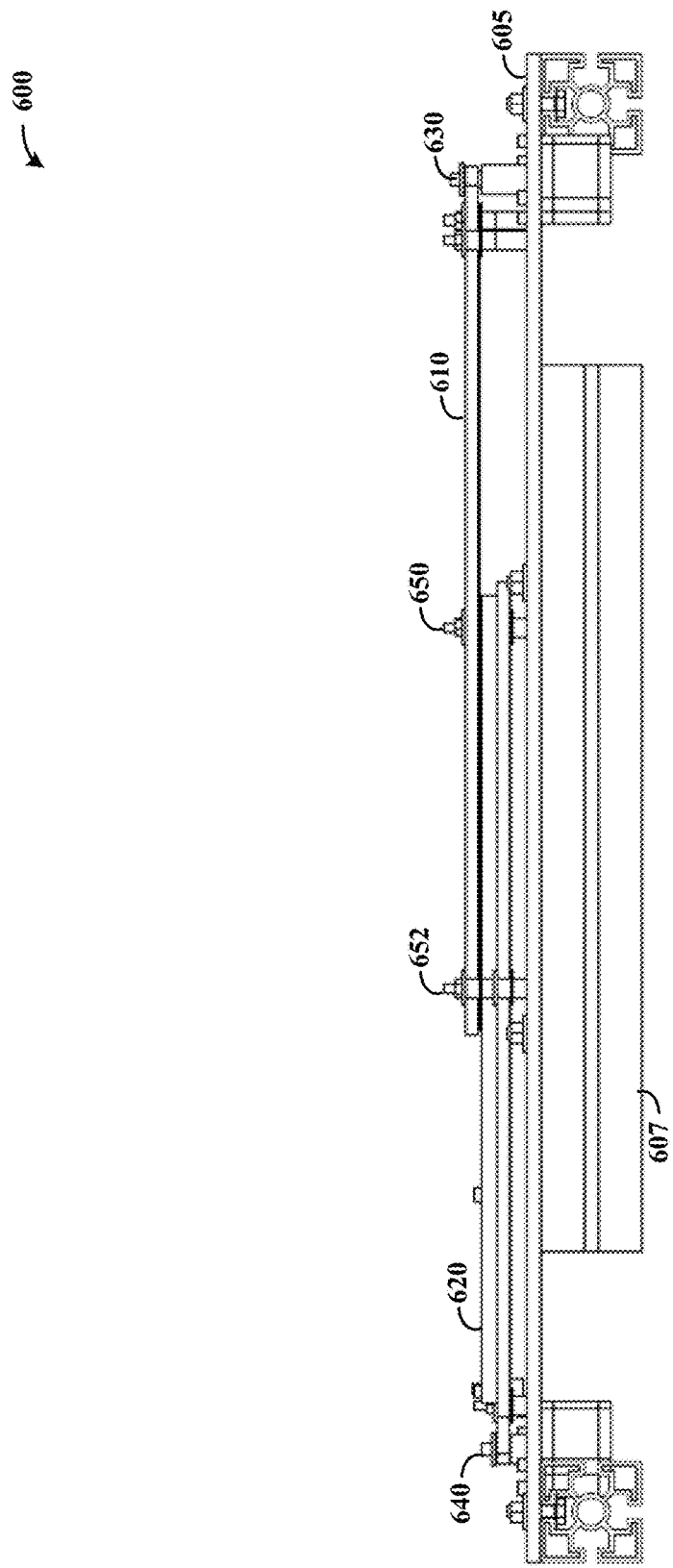
FIG. 6 shows a side view of a dual rotary positioning apparatus, according to an implementation.

FIG. 6 shows a side view of a dual rotary positioning apparatus 600, according to an implementation. The apparatus 600 may, for example, be implemented in accordance with apparatus 200 shown in FIG. 2 and/or 300 shown in FIG. 3 and as characterized above, and includes similar numbering. The apparatus 600 includes base 605 on which first and second platens are located, with multiple supports including support 607. First and second platens 610 and 620 are located on the base 605, with the first platen overlapping the second. Each platen is respectively driven along its perimeter by actuators 630 and 640, and are respectively supported by components 650 and 652.

Figure 7:
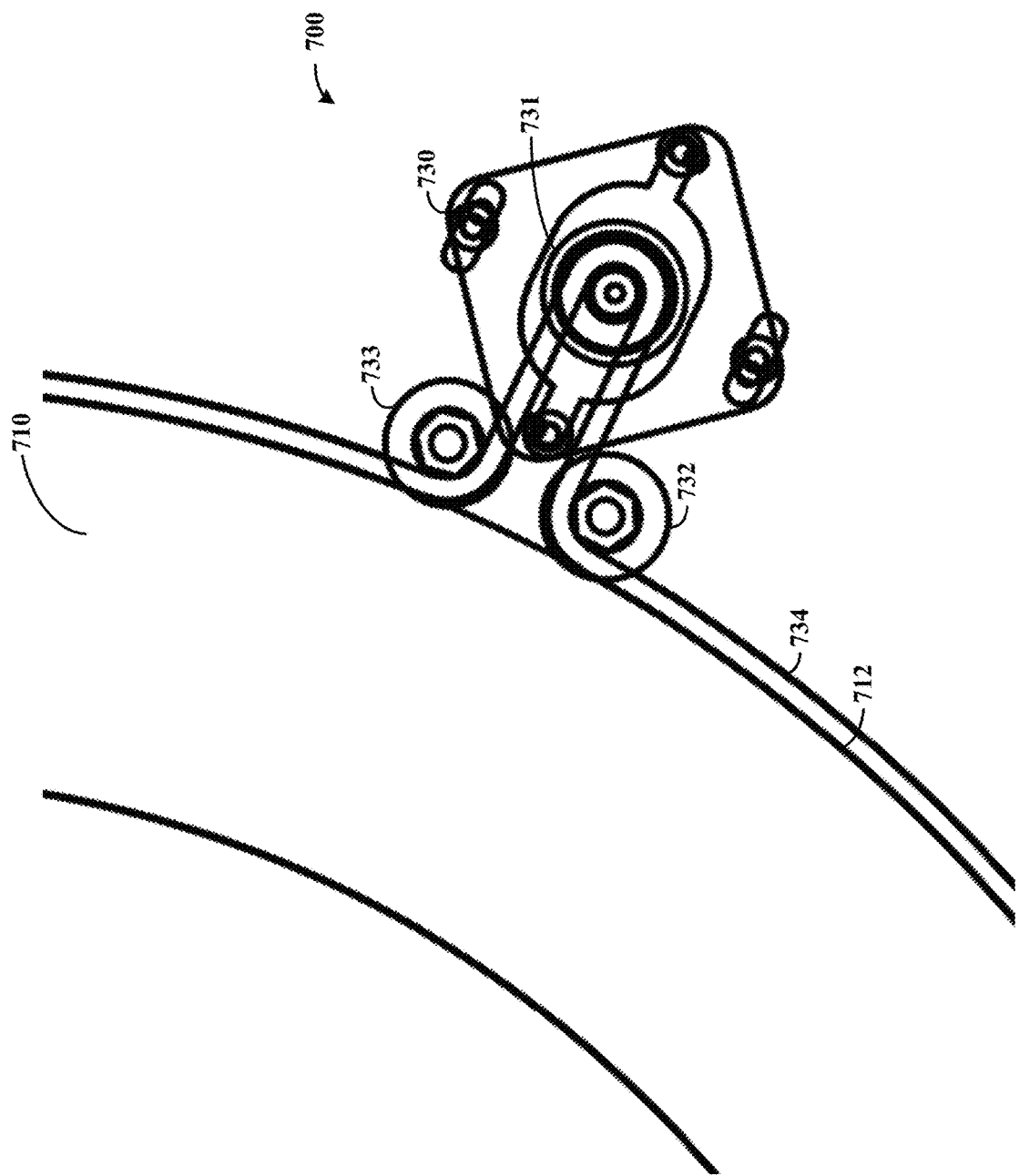
FIG. 7 shows an actuator for a dual rotary positioning apparatus, according to an implementation.

FIG. 7 shows an actuator 700 for a dual rotary positioning apparatus, according to an implementation. The actuator 700 may, for example, be implemented with the embodiments shown in FIGS. 2-6, with a platen 710. The actuator 700 includes a body 730 and a shaft 731 that drives a belt 734 that engages with a perimeter 712 of the platen 710. Support structures (e.g., rollers) 732 and 733 support the platen and provide a surface along which the belt 734 can travel for engagement with the shaft 731.

Figure 8:
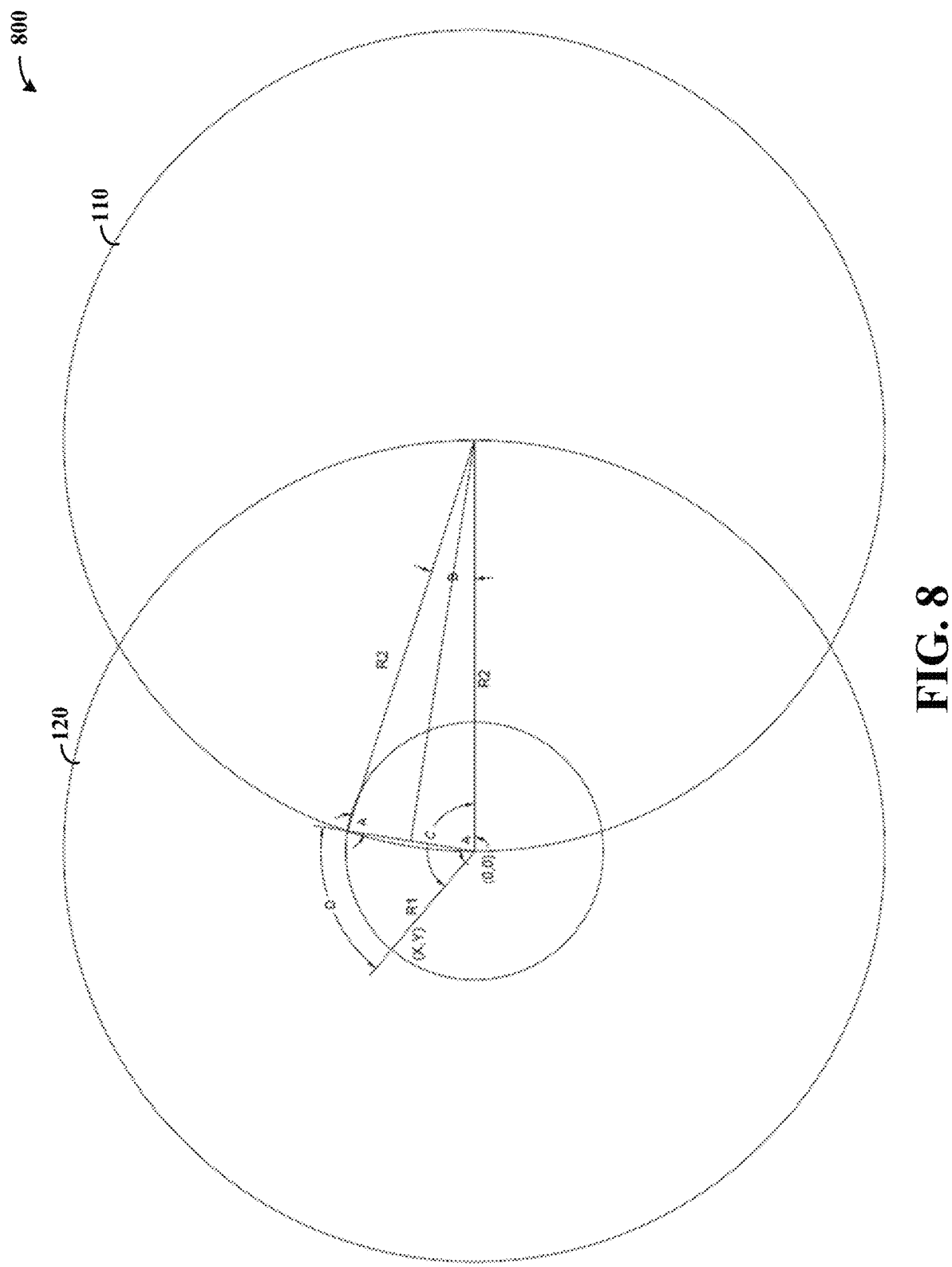
FIG. 8 shows relative positioning of a dual rotary positioning apparatus, according to an implementation.

FIG. 8 shows relative positioning of a dual rotary positioning apparatus 800, according to an implementation. The apparatus includes respective platens 110 and 120, which respectively operate to interact a tool with a workpiece, as may be implemented in accordance with various embodiments herein. Specifically, the apparatus 800 is shown with particular reference to a radius R2 of platen 110, and a smaller radius R1 of a workpiece region on platen 120, at which a particular reference point (X, Y) is shown. Respective angles A, B, C and D are also shown, for illustration with an exemplary embodiment characterized as follows:

Given (X, Y), R1 is found as: $R1 = \sqrt{x^2+y^2}$.
Given (X, Y), C is found as: C=arctan 2(y, x).
Given R1+R2, B is found as:

$$B = 2\sin^{-1}\left(\frac{R1}{2R2}\right)$$

Given B, A is found as:

$$A = \frac{(\pi - B)}{2}$$

Given A, D is found as: D=C−A

Considering the above, the following is implemented for formulating a tool path, in accordance with a particular implementation, involving a tool and belt-driven drive along a perimeter of the respective discs, with comments in brackets.

Sub GetMoves(X, Y, S1)
Dim DiskToolRadius As Double=9.3362 [Radius to tool center (R2)]
Dim BeltRadius As Double=9.1232 [Drive radius]

Dim StartAngle As Double=Math.A tan 2(Y,X) [(C) angle from center of rotation to X,Y      (Formula #2)]

Dim DiskBaseRadius As Double=Distance(0,0,X,Y)
[(R1)calculate radius or point      (Formula #1)]
Dim BAngle As Double
If Y<0 Then BAngle=−2*Math.A sin(DiskBaseRadius/(2*DiskToolRadius))

Else

BAngle=2*Math.A sin(DiskBaseRadius/(2*DiskToolRadius))      [(B)(Formula #3)]

End If
Dim AAngle As Double
If Y<0 Then

AAngle=−(Math.PI−Math.Abs(BAngle))/2

Else

AAngle=(Math.PI−Math.Abs(BAngle))/2      [(A)(Formula #4)]

End If

Dim DeltaAngle As Double=AAngle−StartAngle [(D)(Formula #5)]

Figure 9:
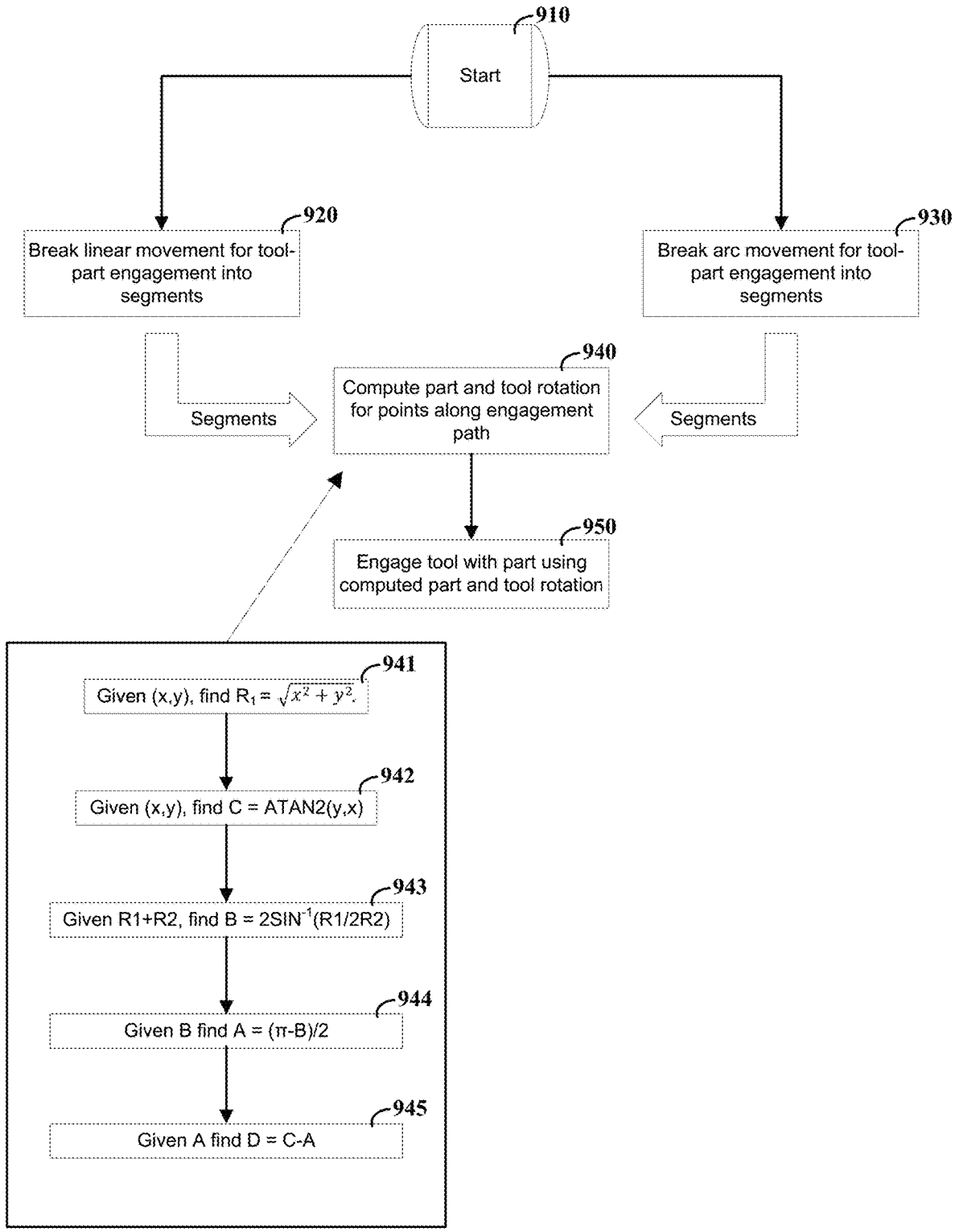
FIG. 9 shows a method for operating a dual rotary positioning apparatus, according to an implementation.

Dim AngleBaseMove As Double=DeltaAngle*BeltRadius [convert angles to distances]
Dim AnglePenMove As Double=(BAngle)*−BeltRadius [convert angles to distances]
Select Case S1
  Case "G1"
  outputList.Items.Add("G1 X"+Format(AngleBaseMove, "0.0000")+"Y"+Format(AnglePenMove, "0.0000")) [print out]
  Case "G0"
  outputList.Items.Add("G0 X"+Format(AngleBaseMove, "0.0000")+"Y"+Format(AnglePenMove, "0.0000")) [print out]
  Case Else
End Select
End Sub FIG. 9 shows a method for operating a dual rotary positioning apparatus, according to an implementation. At block 910, a process for operation begins. Linear movement for a tool-part engagement is broken into segments at block 920, and arc movement for the tool-part engagement is broken into segments at block 930. In this context, the linear and arc (or non-linear) movement correspond to a tool path having contiguous linear and non-linear segments, which form the tool path when combined. These respective blocks 920 and 930 may be carried out concurrently, overlapping or at separate times. At block 940, segments from the linear movement as generated at block 920 are utilized, together with segments from the arc movement as generated at block 930, to compute part (e.g., workpiece) and tool rotation for points along an engagement path (e.g., tool path). The tool is engaged with the part at block 950, in accordance with the part and tool rotation and related points computed at block 940.

The part and tool rotation for respective points, as depicted at block 940, can be computed in a variety of manners. In some implementations, the steps and related equations shown at blocks 941, 942, 943, 944 and 945 are utilized in accordance with the apparatus/approach shown in FIG. 8 to find the respective values as indicated above. These values can then be utilized with engagement of the tool and part.

Figure 10A:
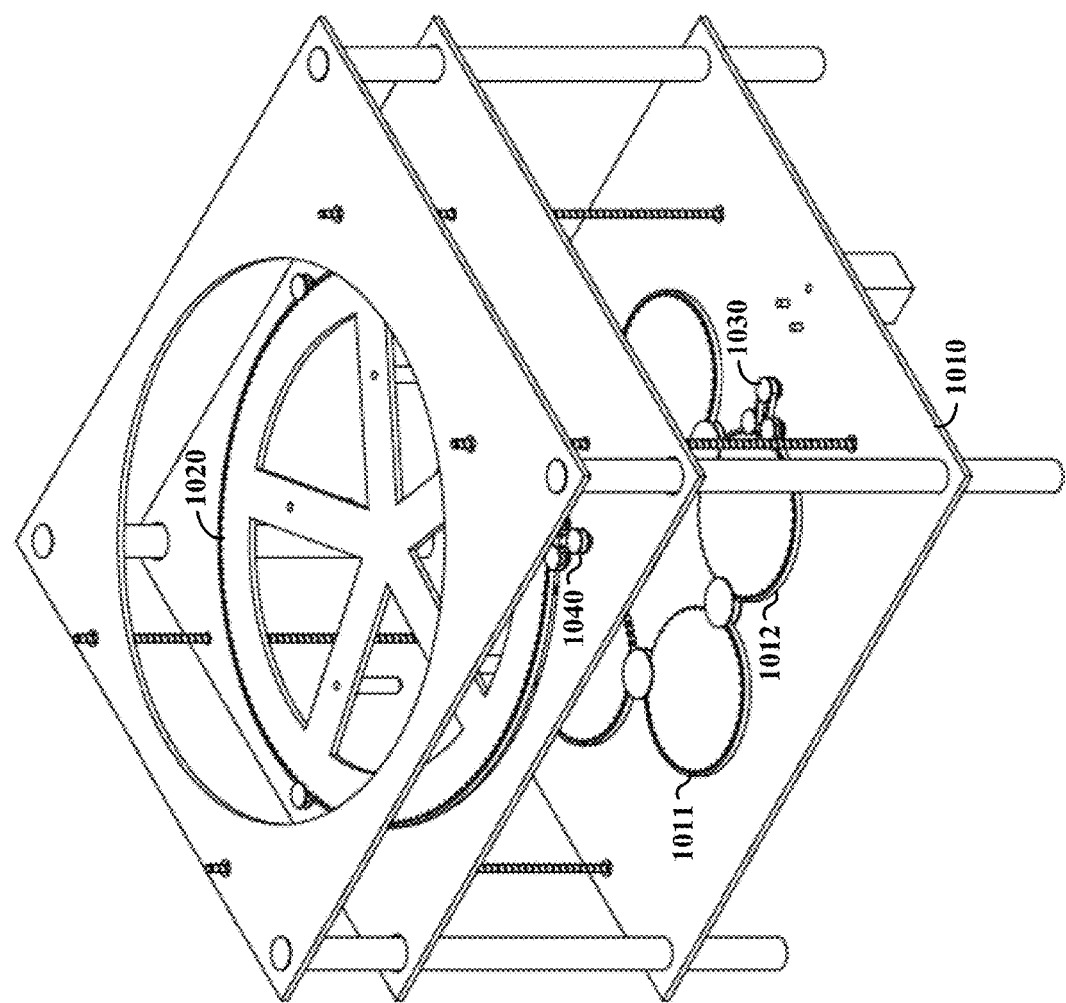
Figure 10B:
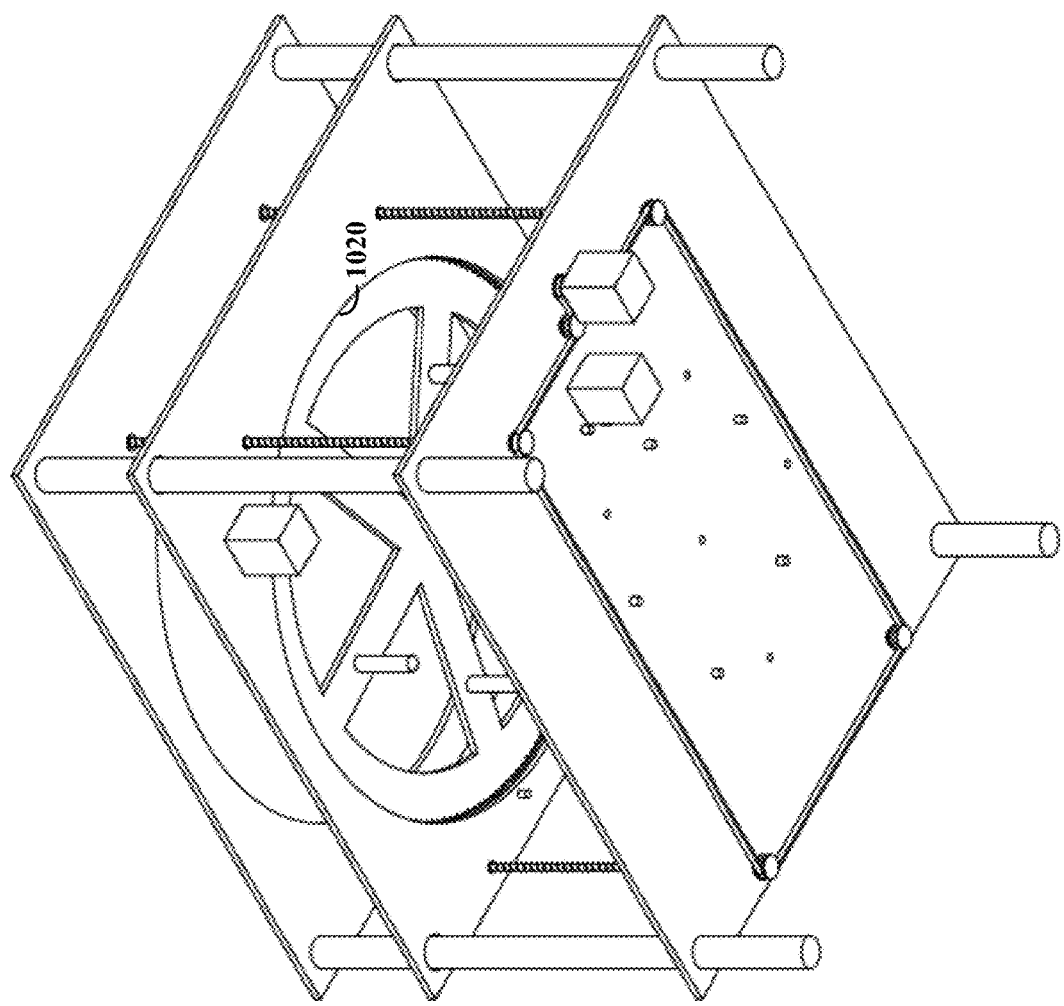
Figure 10C:
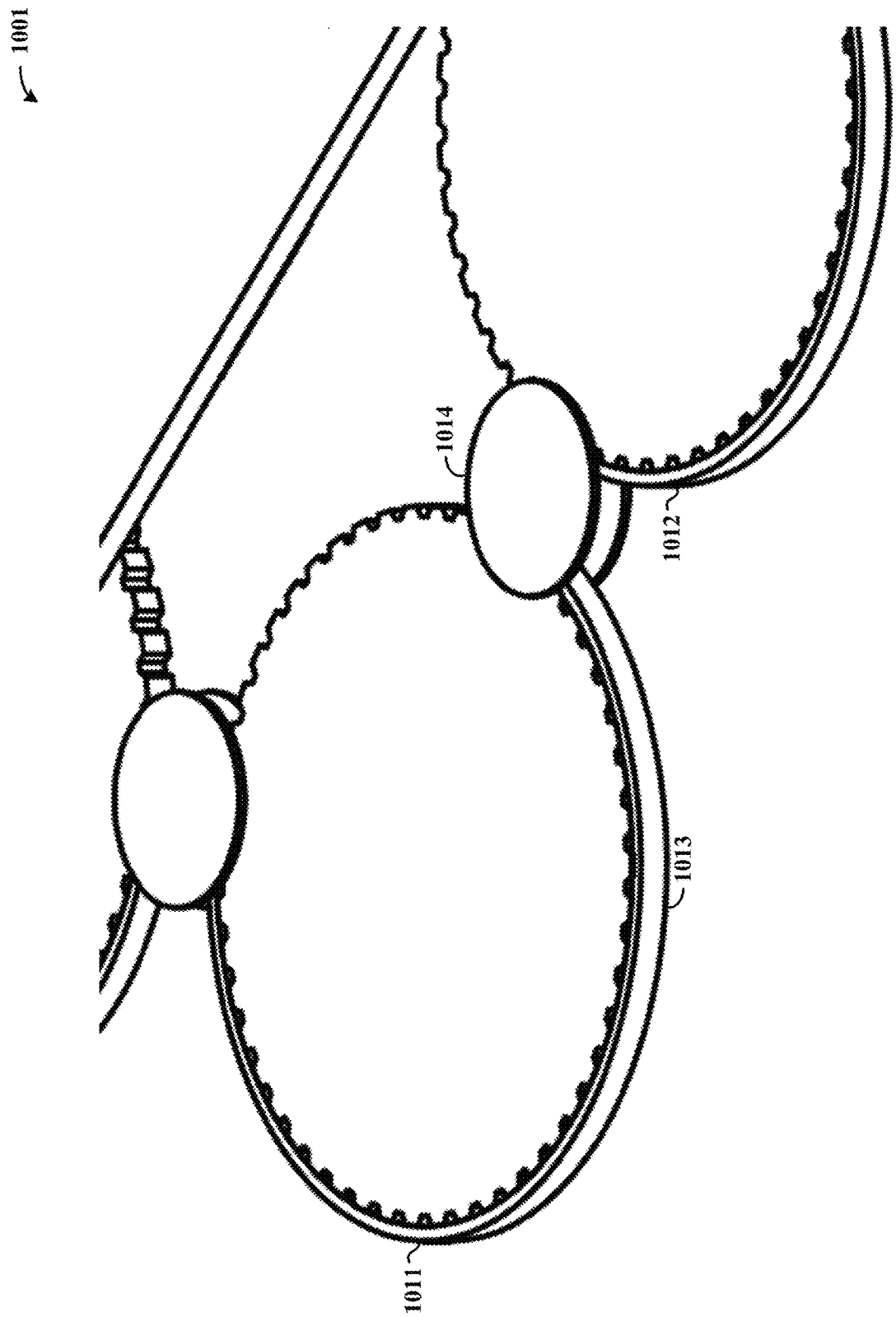

FIGS. 10A-10C show an apparatus 1000 with multiple rotary positioning components, in accordance with another implementation. FIGS. 10A and 10B respectively show top and bottom perspective views, and FIG. 10C shows an enlarged view 1001 of individual rotary components. Referring to FIG. 10A, the apparatus 1000 includes multiple rotary workpiece positioning platens on a platform 1010, including platens 1011 and 1012, labelled by way of example. A rotary tool platform 1020 holds respective tools for engagement with workpieces mounted on the rotary positioning platens. Each platen on platform 1010 is belt-driven by a drive component 1030; however, various other approaches for driving the platens may be implemented, such as characterized with other embodiments herein. The rotary tool platform 1020 is belt-driven by a drive component 1040, which may also be replaced with other drive components as well. FIG. 10B shows the underside of the rotary tool platform 1020, to which various tools may be attached. As such, multiple workpieces can be machined or otherwise interacted with, using a common set of movements among the respective workpiece and tool platforms, in unison.

Referring to FIG. 10C, workpiece platens 1011 and 1012 are shown in an enlarged view, with a serpentine belt 1013 travelling around each platen and pulleys therebetween. Pulley 1014 is shown by way of example.

The present invention is thought to be applicable to a variety of applications. Other aspects and embodiments will be apparent to those skilled in the art from consideration of the specification and practice of the circuits and methods disclosed herein. It is intended that the specification and illustrated embodiments be considered as examples only, with a true scope of the invention being indicated by the following claims.

What is claimed is:

1. An apparatus comprising:
   a first platen having a first fixed axis of rotation, the first platen being configured and arranged to hold a workpiece centered in a position offset from the first axis of rotation and to move the workpiece along a first arc by rotating about the first axis of rotation;
   a second platen having a second fixed axis of rotation that is laterally offset from the first axis of rotation, the second platen being configured and arranged to secure a tool and to move the tool along a second arc by rotating about the second axis of rotation, the first and second arcs being nonconcentric; and
   the first and second platens being configured and arranged with each other to engage the tool with the workpiece for a distance along a defined tool path with the workpiece being held by the first platen during and after engagement of the tool with the workpiece, by moving the workpiece and the tool respectively along the first arc and the second arc via relative rotation about the respective first and second axes of rotation.

2. The apparatus of claim 1, further including an actuator circuit configured and arranged to rotate the first and second platens relative to one another along the respective first and second arcs, and therein cause the tool to engage with the workpiece along the defined tool path at an intersection of respective arcs along which the tool and workpiece travel, as the first and second platens move relative to one another and respectively move the workpiece and the tool.

3. The apparatus of claim 2, wherein the actuator circuit is configured and arranged to convert the tool path to relative rotational coordinates for the first and second platens, and to rotate the first and second platens based on the relative rotational coordinates.

4. The apparatus of claim 1, further including:
   a first actuator coupled to and configured and arranged to rotate the first platen about the first axis of rotation, and
   a second actuator coupled to and configured and arranged to rotate the second platen about the second axis of rotation.

5. The apparatus of claim 4, wherein at least one of the first actuator and the second actuator is configured and arranged to rotate the respective platen that the at least one of the first actuator and the second actuator is coupled to by mechanically engaging with a perimeter of the respective platen.

6. The apparatus of claim 4, wherein at least one of the first actuator and the second actuator is configured and arranged to rotate the respective platen that the at least one of the first actuator and the second actuator is coupled to by mechanically engaging with and rotating a center portion of the platen at its axis of rotation.

7. The apparatus of claim 4, wherein at least one of the first actuator and the second actuator is an electromechanical actuator configured and arranged to rotate the respective platen to which it is coupled in response to inputs from a control circuit.

8. The apparatus of claim 1, wherein at least one of the first platen and the second platen is coupled to and rotates about a shaft extending along its axis of rotation.

9. The apparatus of claim 1, further including:
   a first actuator coupled to and configured and arranged to rotate the first platen about the first axis of rotation,
   a second actuator coupled to and configured and arranged to rotate the second platen about the second axis of rotation,
   a control circuit configured and arranged to cause the tool to engage with the workpiece along a tool path that follows an intersection of respective arcs along which the tool and workpiece move, by driving the first and second actuators to rotate the first and second platens.

10. The apparatus of claim 9, wherein the control circuit is configured and arranged to convert the tool path to relative rotational coordinates for the first and second platens, and to respectively drive the first and second actuators to rotate the first and second platens based on the relative rotational coordinates.

11. The apparatus of claim 1, wherein the second arc crosses over the first axis of rotation.

12. The apparatus of claim 1,
   wherein the first platen is mounted to a support structure,
   wherein the second platen is configured and arranged to secure a plurality of tools,
   further including a plurality of additional platens, each additional platen having an axis of rotation and being configured and arranged to hold a workpiece and to move the workpiece along an arc by rotating about its axis of rotation, the first platen and the plurality of additional platens are coupled to rotate synchronously in response to a common rotational input, and
   wherein each of the plurality of additional platens is configured and arranged with the second platen to engage one of the plurality of tools with a workpiece held by the additional platen by moving the workpiece and the tool respectively along the arc of the platen and the second arc via relative rotation about the respective axis of rotation of the platen and the second axis of rotation.

13. The apparatus of claim 1, wherein the defined tool path has contiguous linear and non-linear segments.

14. An apparatus comprising:
a first platen having a first axis of rotation, the first platen being configured and arranged to hold a workpiece and to move the workpiece along a first arc by rotating about the first axis of rotation;
a second platen having a second axis of rotation, the second platen being configured and arranged to secure a tool and to move the tool along a second arc by rotating about the second axis of rotation, and to secure a material feeder at a fixed position relative to the tool and to maintain the fixed relative positioning of the material feeder as the second platen rotates about the second axis; and
the first and second platens being configured and arranged with each other to engage the tool with the workpiece for a distance along a defined tool path with the workpiece being held by the first platen during and after engagement of the tool with the workpiece, by moving the workpiece and the tool respectively along the first arc and the second arc via relative rotation about the respective first and second axes of rotation.

15. The apparatus of claim 14, further including the material feeder, the material feeder being secured to the second platen and configured and arranged to provide the material to the tool as the tool is engaged with the workpiece.

16. The apparatus of claim 15, further including the tool, the tool being configured and arranged to transfer the material to the workpiece via the engagement.

17. An apparatus comprising:
a first platen having a first fixed axis of rotation, the first platen having a workpiece mount to mount to a workpiece with the workpiece mount centered in a position that is offset from the first axis of rotation, and the first platen being configured and arranged to move the workpiece mount along a first arc by rotating about the first axis of rotation; and
a second platen having a second fixed axis of rotation that is laterally offset from the first axis of rotation, the second platen having a tool mount to mount to a tool and being configured and arranged to move the tool mount along a second arc by rotating about the second axis of rotation, the first and second arcs being nonconcentric, the first and second platens being configured and arranged to rotate relative to one another such that an engagement portion of the tool at a tool-workpiece intersection point offset from and fixed relative to the second platen follows a tool path that is offset from and fixed relative to the first platen as the first and second platens rotate, and such that the tool engages with the workpiece for a distance along the tool path with the workpiece being held by the first platen during and after engagement of the tool with the workpiece.

18. The apparatus of claim 17, further including a control circuit configured and arranged to control movement of the first and second platens along the respective arcs such that the engagement portion of the tool engages with the workpiece along the tool path.

19. The apparatus of claim 18, wherein the control circuit is configured and arranged to convert the tool path to relative rotational coordinates for the first and second platens, and to control rotation of the first and second platens based on the relative rotational coordinates.

20. A method comprising:
mounting a workpiece to a first platen having a first fixed axis of rotation, the workpiece being centered in a position offset from the first axis of rotation; and
engaging a tool, mounted to a second platen having a second fixed axis of rotation that is laterally offset from the first axis of rotation, with the workpiece by:
rotating the first platen about the first axis of rotation and therein moving the workpiece along a first arc relative to the first axis of rotation, and
rotating the second platen about the second axis of rotation and therein moving the tool along a second arc relative to the second axis of rotation, the first and second arcs being nonconcentric, therein engaging the tool with the workpiece for a distance along a tool path while the workpiece remains mounted on the first platen during and after engagement of the tool with the workpiece.

21. The method of claim 20, wherein engaging the tool with the workpiece includes moving the tool along a tool path on the workpiece via rotation of the first platen and the second platen.

22. The method of claim 21, further including converting the tool path to relative rotational coordinates for the first and second platens, wherein rotating the first platen and rotating the second platen includes rotating the respective platens relative to one another based on the relative rotational coordinates.

* * * * *